A. PAOLI

Feb. 7, 1933. BANANA PROTECTOR Re. 18,728

Original Filed Feb. 18, 1929

INVENTOR
A. PAOLI
BY Munn & Co.
ATTORNEYS

Reissued Feb. 7, 1933

Re. 18,728

UNITED STATES PATENT OFFICE

ARTHUR PAOLI, OF IRONWOOD, MICHIGAN

BANANA PROTECTOR

Original No. 1,847,494, dated March 1, 1932, Serial No. 340,932, filed February 18, 1929. Application for reissue filed October 12, 1932. Serial No. 637,516.

This invention relates to separable casings and more particularly to banana protectors, although certain features thereof may be employed with equal advantage for other purposes.

One object of my invention is to provide a banana protector which has novel means for supporting a bunch of bananas and encasing the bunch of bananas.

Another object of my invention is to provide a device of the character mentioned which has novel means whereby the casings may be moved away from the bunch of bananas.

A further object is to provide a device of the type mentioned which has novel means for guiding the casings toward and into engagement with each other for enclosing the bunch of bananas.

A still further object is to provide a device of the type mentioned with means for heating the interior of the casings to prevent freezing of bananas or other commodities.

Other objects and advantages will appear in the following specification, and the novel features of the invention will be particularly pointed out in the appended claims.

Figure 1:
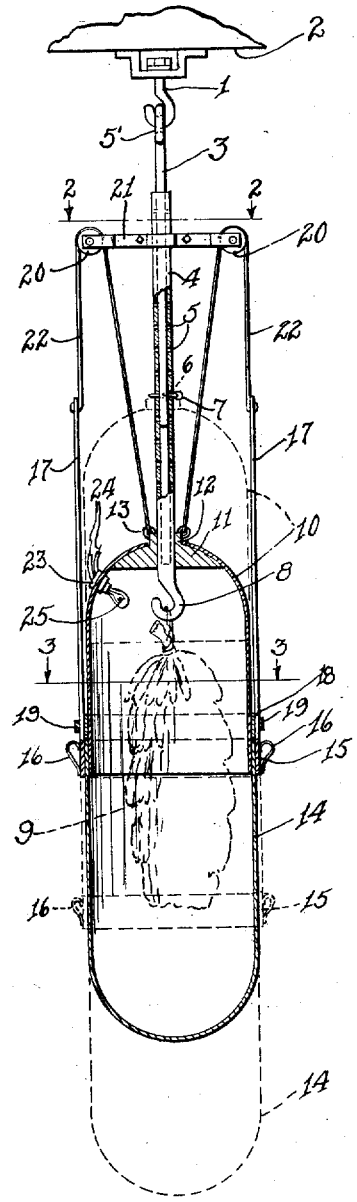
Figure 2:
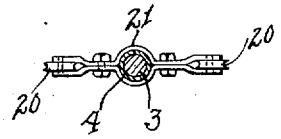
Figure 3:
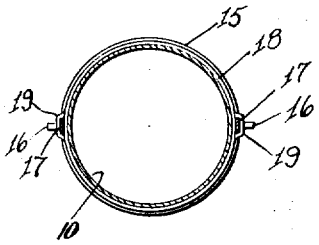

The invention is illustrated in the accompanying drawing forming part of this application, in which Figure 1 is a longitudinal sectional view of my device, Figure 2 is a section along the line 2—2 of Figure 1, and Figure 3 is a section along the line 3—3 of Figure 1.

The structure selected for illustration comprises a rotating hook member 1 which may be secured to any suitable support such as a ceiling 2. A supporting member is composed of a rod 3, which is slidably disposed in a sleeve 4 having a plurality of openings 5 therein. The upper end of the rod 3 is provided with an eyelet 5′ which is arranged to receive the hook member 1. An opening 6 is provided in the rod 3 for receiving a pin 7 that is arranged to extend through any of the openings 5 in the sleeve 4. The lower end of the sleeve 4 is provided with a supporting hook for receiving a bunch of bananas, indicated at 9.

An inner or upper casing 10 is carried by a weight member 11 which is slidably mounted upon the sleeve 4. The weight member 11 is provided with a collar portion 12 which extends through the inner casing 10 and is provided with eyelets 13.

A lower or outer casing 14 is provided and arranged to receive the inner casing 10. A reinforcing strip 15 is disposed around the casing 14 at the upper edge thereof. Gripping members 16 are carried by the reinforcing strip 15. Upwardly projecting arms 17 are carried by or integral with the reinforcing strip 15. A reinforcing band 18 is disposed around the inner casing 10 and is provided with guide members 19 which are arranged to receive the arms 17. A set of pulleys 20 are rotatably carried by brackets 21 which are rigidly secured to the sleeve 4 at any desired position. Cables 22 extend over the pulleys 20 and have their outer ends secured to the arms 17 while their inner ends are secured to the eyelets 13.

A socket 23 is carried by the inner casing 10 and is in electrical connection with a source of current by means of conductors 24. A heating unit or electric light 25 is disposed in the socket 23.

From the foregoing description of the various parts of the device, the operation thereof may be readily understood. When the two casings are brought together, the bunch of bananas is completely inclosed. When the surrounding temperature is low, the heating unit 25 may be illuminated so as to heat the interior of the two casings.

The weight member 11 counterbalances the weight of the outer casing 14 and tends to hold the casings 10 and 14 at any placed position. The operator may move the casings 10 and 14 away from the bunch of bananas by pulling downwardly upon the gripping members 16 which are carried by the outer casing 14. This movement of the outer casing will impart an upward movement to the inner casing due to the cable connection between the two casings. The pin 7 serves two purposes, namely: the holding of the rod 3 and the sleeve 4 together, and the serving as a stop for the upper casing. When the casings are in this position they are positioned away from the bunch of bananas so as to permit free access to the bananas. During this movement of the casings away from each other, the arms 17 will move through the guides 19 so as to hold the casing in general alignment with each other.

In closing the casings the operator raises the lower casing by the gripping members 16 until the lower end of the upper casing is received in the lower casing. The arms 17, as they slide through the guides 19, guide the casings 10 and 14 into their interlocking positions to constitute a completely enclosed shell. It should be noted, however, that the casings 10 and 14 need not telescope into each other but may merely approach each other with the peripheral edges in meeting contact. This is sufficient to preclude exposure of the contents within the shell defined by the cooperating casings 10 and 14. As shown, the band 18, upon the upper casing 10, serves as a stop member for limiting the movement of the two casings toward each other.

The hook member 1 permits the device to be swung about its pivot as might be desired when picking bananas from the bunch. The casing 10 may be formed of any suitable material, preferably from material which is transparent such as celluloid or the like. The purpose of this is that the clerks and the customers may be able to see the bananas without removing the casings and in this manner the casings are not only serving as protection for the bananas, but also as a means of displaying the bananas.

I claim:

1. In a device of the type described, the combination of a depending supporting member and a shell comprising a pair of casings disposed in telescoping relationship, one of said casings being slidably mounted on the supporting member.

2. In a device of the type described, the combination of a depending supporting member, a shell comprising a pair of casings disposed in telescoping relationship, one of said casings being slidably mounted on the supporting member, said supporting member being provided with a hook portion extending within the shell, and tie means carried by said supporting member and connected with the casings whereby said casings may be moved in opposite directions when the casings are actuated.

3. In a device of the type described, the combination of a supporting member, a depending supporting member adjustably connected therewith, a shell comprising a pair of casings disposed in telescoping relationship, one of said casings being slidably mounted on the supporting member, said supporting member being provided with a hook portion extending within the shell and tie means carried by said supporting member and connected with said casings whereby said casings may be moved in opposite directions when the casings are actuated.

4. In a device of the type described, the combination of a supporting member, a depending supporting member adjustably connected therewith, a shell comprising a pair of casings disposed in telescoping relationship, one of said casings being slidably mounted on the supporting member, said supporting member being provided with a hook portion extending within the shell, a supporting arm connected with the depending supporting member, and tie means movably carried by said supporting arm and connected with the casings whereby said casing may be moved in opposite directions when the casings are actuated.

5. In a device of the character described, the combination with a shell comprising confronting casings, of means for guiding the approach and separation of said casings to open and close said shell for the purpose set forth, and means for counterbalancing said casings so that movement of one effects the corresponding movement of the other in an opposite direction.

6. In a device of the character described, the combination with a shell comprising confronting casings, of means for guiding the approach and separation of said casings to open and close said shell for the purpose set forth, and tie members inter-connecting said casings so that movement of one effects the corresponding movement of the other in an opposite direction.

7. In a device of the character described, the combination with an elongated supporting member, of a tubular casing slidably associated with said supporting member, another tubular casing complemental to said first named casing, guide means for slidably mounting said casing relative to said first named casing to define an enclosed shell in their fully approached relation, and tie members inter-connecting said casings so that movement of one of said casings effects corresponding movement of the other of said casings in an opposite direction.

8. In a device of the character described, the combination with an elongated supporting member, of a tubular casing slidably associated with said supporting member, another tubular casing complemental to said first named casing, guide means for slidably mounting said casing relative to said first named casing to define an enclosed shell in their fully approached relation, a bracket adjustably mounted along said supporting member, pulleys journalled on the extremities of said brackets, and tie members interconnecting said casings for traction with said pulleys so that movement of one of said casings effects corresponding movement of the other of said casings in an opposite direction.

9. In a device of the character described, the combination with an elongated supporting member, of a tubular casing slidably associated with said supporting member, another tubular casing complemental to said first named casing, guide means for slidably mounting said casing relative to said first named casing to define an enclosed shell in their fully approached relation, a bracket adjustably mounted along said supporting member, pulleys journalled on the extremities of said brackets, tie members interconnecting said casings for traction with said pulleys so that movement of one of said casings effects corresponding movement of the other of said casings in an opposite direction, and reinforcing bands enveloping the open peripheral edge of said casings.

In witness whereof, I subscribe my name.

ARTHUR PAOLI.